(12) United States Patent
Lutze et al.

(10) Patent No.: US 11,869,705 B2
(45) Date of Patent: Jan. 9, 2024

(54) TRANSFORMER FOR A DC/DC VOLTAGE CONVERTER

(71) Applicant: SIEMENS AKTIENGESELLSCHAFT, Munich (DE)

(72) Inventors: Marcel Lutze, Nuremberg (DE); Markus Pfeifer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 1150 days.

(21) Appl. No.: 16/494,283

(22) PCT Filed: Mar. 16, 2017

(86) PCT No.: PCT/EP2017/056255
§ 371 (c)(1),
(2) Date: Sep. 13, 2019

(87) PCT Pub. No.: WO2018/166601
PCT Pub. Date: Sep. 20, 2018

(65) Prior Publication Data
US 2020/0135387 A1 Apr. 30, 2020

(51) Int. Cl.
*H01F 27/30* (2006.01)
*H01F 27/28* (2006.01)
(Continued)

(52) U.S. Cl.
CPC ....... *H01F 27/306* (2013.01); *H01F 27/2828* (2013.01); *H01F 27/29* (2013.01); *H02M 3/325* (2013.01); *H02M 3/33573* (2021.05)

(58) Field of Classification Search
CPC ................. H02M 3/325; H02M 3/33573
See application file for complete search history.

(56) References Cited

U.S. PATENT DOCUMENTS

| 2008/0192510 A1* | 8/2008 | Falk | H02M 3/337 363/17 |
| 2010/0182803 A1* | 7/2010 | Nan | H02M 3/33592 363/21.02 |
| 2017/0331386 A1* | 11/2017 | Babazadeh | H02M 3/3376 |

FOREIGN PATENT DOCUMENTS

| CN | 102723881 A | 10/2012 |
| CN | 105788860 A | 7/2016 |

(Continued)

OTHER PUBLICATIONS

PCT International Search Report and Written Opinion of International Searching Authority dated Dec. 1, 2017 corresponding to PCT International Application No. PCT/EP2017/056255 filed Mar. 16, 2017.

(Continued)

*Primary Examiner* — Adolf D Berhane
*Assistant Examiner* — Afework S Demisse
(74) *Attorney, Agent, or Firm* — Lempia Summerfield Katz LLC

(57) ABSTRACT

A transformer for a DC-DC converter, such as a resonant converter, is provided. The converter includes a transformer unit that includes at least one winding with a first winding connection and a second winding connection, and a capacitor assembly consisting of at least one capacitor with a first capacitor assembly connection and a second capacitor assembly connection. The capacitor assembly is arranged so as to lie against the transformer unit in order to form an assembly. The capacitor assembly connections are connected to the winding connections via one or more first connection parts in a specified manner with respect to the electric connections. The capacitor assembly connections and/or the winding connections are electrically connected to multiple second connection parts in a specified manner with (Continued)

respect to the electric connections for connecting to a first power module and a second power module.

15 Claims, 3 Drawing Sheets

(51) Int. Cl.
    *H01F 27/29*     (2006.01)
    *H02M 3/325*     (2006.01)
    *H02M 3/335*     (2006.01)

(56)     References Cited

FOREIGN PATENT DOCUMENTS

| | | |
|---|---|---|
| DE | 112010005649 T5 | 11/2013 |
| DE | 102013007850 A1 | 11/2014 |
| EP | 1248355 A1 | 10/2002 |
| WO | 2011154993 A1 | 12/2011 |

OTHER PUBLICATIONS

Zhang, Hong: "Circuit and electronic technology learning and experimental and practical guidance (Second Edition)", pp. 178-183, Beihang university press, Apr. 2007, with English translation.
Chinese Office Action for Chinese Application No. 201780088471.4 dated Jul. 22, 2021, with English translation.

\* cited by examiner

TRANSFORMER FOR A DC/DC VOLTAGE CONVERTER

This application is the National Stage of International Application No. PCT/EP2017/056255, filed Mar. 16, 2017. The entire contents of this document are hereby incorporated herein by reference.

BACKGROUND

The present embodiments relate to a transformer for a DC/DC voltage converter.

A DC/DC voltage converter having two bridge circuits and a transformer arranged between the two bridge circuits makes it possible both to connect generation units (e.g., wind power installations, photovoltaic installations, storage systems, battery chargers, etc.) and to connect electrical loads, such as, for example, drives, to DC voltage grids. Via a DC/DC voltage converter, it is possible to connect DC voltage grids of the same and also different voltages. Galvanic isolation is provided by the transformer arranged between the two bridge circuits.

FIG. 1 shows a schematic illustration of a known DC/DC voltage converter. The DC/DC voltage converter has a first bridge circuit 10 by which a first DC voltage $U_1$ of a DC voltage source 16 is transformed into an AC voltage. The first DC voltage $U_1$ is present between a first supply potential terminal 14 and a reference potential terminal 15. The DC voltage source 16 may be, for example, one of the above-mentioned generation units (e.g., wind power installation, photovoltaic installation, storage system, battery charger, etc.). The AC voltage generated by the first bridge circuit 10 is transformed by a transformer 30 that has a predefined turns ratio n:1. The AC voltage generated by the transformer is converted back into a DC voltage $U_2$ by a following second bridge circuit 20. The second DC voltage $U_2$ is present between a second supply potential terminal 24 and a second reference potential terminal 25. As a result, the DC voltage $U_1$ present on the input side of the DC voltage converter may be converted into another DC voltage $U_2$ in order to supply a load 40 on the output side. Both the first bridge circuit 10 and the second bridge circuit 20 have a smoothing capacitor 13, 23, respectively, between the respective supply potential terminal 14, 24 and the respective reference potential terminal 15, 25, by which smoothing capacitor voltage fluctuations (e.g., ripple) are smoothed. These voltage fluctuations may be generated both by interference in the attached installations (e.g., cable network, overhead line network, etc.) and by the switching procedures in the bridge switches 10, 20.

In the exemplary embodiment shown in FIG. 1, the first bridge circuit 10 and the second bridge circuit 20 have an identical structure on both sides of the transformer 30. Each bridge circuit 10, 20 has two power modules 11M, 12M, respectively, and 21M, 22M, respectively. Each of the power modules 11M, 12M and 21M, 22M, has two series- interconnected semiconductor switches 11, 12, and 21, 22, respectively. IGBTs or MOSFETs may be used as semiconductor switches. The power modules 11M, 12M and 21M, 22M are each connected between the supply potential terminals 14, 24, respectively, and reference potential terminals 15, 25, respectively, of the first bridge circuit 10 and the second bridge circuit 20, respectively.

Output terminals 11A, 12A of the power modules 11M, 12M of the first bridge circuit 10 are connected to a primary side of the transformer 30. Secondary-side terminals of the transformer 30 are connected to input terminals 21E, 22E of the power modules 21M, 22M of the second bridge circuit 20.

Via the transformer 30, both bridge circuits 10, 20 and therefore both sides of the DC/DC voltage converter 1 are galvanically separated from one another. The galvanic separation leads to advantages in terms of the configuration of the DC/DC voltage converter, to a higher quality of the transformed DC voltage, and prevents the propagation of faults and interference that occur in the installations or components connected to the bridge circuits 10, 20.

In a manner known to those skilled in the art, the transformer 30 is modeled by an ideal transformer having a primary winding 31, a secondary winding 32, a turns ratio n:1, and a stray inductance 33. The stray inductance 33, which is illustrated as a separate component in the electrical circuit diagram of FIG. 1, is a physical constituent of the transformer.

A capacitor 34 or a capacitor arrangement 34 is provided between the output terminal 11A of the power module 11M and the stray inductance 33. By using the capacitor 34 connected in series with the stray inductance, this stray inductance is able to be compensated. As a result of this, the power semiconductor switching elements of the power module 11M, 12M generate fewer losses, and the current flowing through the transformer 30 adopts a sinusoidal profile. A topology as shown in FIG. 1 is referred to as a series resonant converter and is used, for example, in the relatively high power range. In such a series resonant converter, DC voltage suppression is also achieved by using the capacitor 34.

The transformer 30, including the primary winding 31, the secondary winding 32, and the intrinsically present stray inductance 33, is typically cast with an insulating and thermally conductive plastic. The capacitor 34 is then connected as a standalone component. For this purpose, an electrical connection between a turn of the primary winding of the transformer 30 and the capacitor 34 using corresponding connection technology is used. One disadvantage of this procedure is that it results in a high technical outlay in terms of material, weight, and volume. The link connections between the capacitor 34 and the cast transformer 30 are also comparatively long, such that losses arise in the connecting lines and connections due to the skin and proximity effect.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a transformer that is structurally and/or functionally improved and has lower losses at high transmission frequencies is provided.

The present embodiments provide a transformer for a DC/DC voltage converter (e.g., a resonant converter). The transformer includes a transformer unit that includes at least one winding having a first winding terminal and a second winding terminal. The transformer also includes a capacitor arrangement consisting of at least one capacitor having a first capacitor arrangement terminal and a second capacitor arrangement terminal. The capacitor arrangement is arranged so as to bear on the transformer unit so as to form a structural unit. The capacitor arrangement terminals are connected in a predefined manner in terms of the electrical connection to the winding terminals via one or more connecting parts. The capacitor arrangement terminals and/or the winding terminals are electrically connected in a predefined manner in terms of the electrical connection to a plurality of second connecting parts for connection to a first power module and a second power module.

The capacitor arrangement and the transformer unit form a structural unit in which the capacitor arrangement is virtually integrated into the transformer unit. This makes it possible to use, for example, flat parts or wires, or stranded wires to create a required electrical connection. The electrical connections are thereby able to be configured so as to be short, which is advantageous, for example, at high transmission frequencies, as the losses arising due to the skin and proximity effect are able to be kept small It is additionally thereby made possible to use structurally smaller ceramic capacitors. Since the capacitor arrangement together with the transformer unit forms a structural unit, it is possible to arrange the power electronics in the form of the power modules directly next to the transformer unit. As a result of this, the electrical connections between the active and passive assemblies are also able to be kept short. The transformer according to one or more of the present embodiments also makes it possible, for example, to electrically connect the power modules to the transformer using flat parts that reduce losses.

According to one exemplary configuration, there is provision for the at least one capacitor of the capacitor arrangement to be arranged on a carrier. Arranging the at least one capacitor on a carrier makes it easier to arrange and electrically connect the capacitor arrangement on and to the transformer unit.

A further exemplary configuration makes provision for the carrier to include a conductor track structure to which the at least one capacitor and the first connecting part or parts and the second connecting parts are electrically connected. Any desired number of capacitors may thus be initially arranged on the carrier, and the capacitors may be electrically connected in a desired manner. The component unit, including the number of capacitors and the carrier, may then be arranged as a whole on the transformer unit.

A further configuration makes provision for a first current path to run over the carrier and a second current path that is electrically separate from the first current path to run behind the carrier, depending on the electrical connection. The length of the current paths is thereby able to be minimized. In one embodiment, the current may not be channeled over lines that are limited in terms of cross section, but rather, the current may be channeled areally. This promotes the minimization of losses.

A further exemplary configuration makes provision for the first connecting part or parts and/or the second connecting parts to be soldered or screwed or clamped to the carrier and/or the winding terminals. The selection of the contact-making variants may be determined depending on the spatial conditions and/or a desired contact resistance.

A further exemplary configuration makes provision for the at least one capacitor to be a ceramic capacitor. Using ceramic capacitors entails the advantage that these occupy a smaller installation space in comparison with conventional capacitors. This is advantageous, for example, at high transmission frequencies.

A further exemplary configuration makes provision for the transformer unit to include a housing in which the at least one winding is arranged, where the first winding terminal and the second winding terminal are routed out of the housing. Providing a housing makes it possible to apply the capacitor arrangement to the transformer unit. For this purpose, the capacitor arrangement may be attached, for example, directly to a housing wall. If the transformer unit includes a separate series inductor, then this may also be arranged inside the housing.

In one embodiment, the capacitor arrangement may be arranged so as to bear on the housing so as to form the structural unit.

A further exemplary configuration makes provision for the structural unit consisting of the capacitor arrangement and the transformer unit (e.g., the housing) to be arranged in a common casting compound, where the second connecting parts protrude out of the casting compound for connection to the first power module and the second power module. A conventional insulating and thermally conductive plastic may be used as casting compound. To surround the structural unit with the casting compound, the structural unit consisting of the capacitor arrangement and the transformer unit may be introduced into a further housing.

According to a further exemplary configuration, there is provision for the connection between a capacitor of the capacitor arrangement and one of the first connecting parts or one of the second connecting parts to be created by a solder connection by inserting the flat part in question into a groove of the capacitor in which capacitor terminals end, and connecting the capacitor to the connecting part in question with solder. This configuration makes use of the fact that capacitors often have lugs arranged on the side having the groove that is able to accommodate the connecting parts for the electrical connection. The flat parts may easily be connected to corresponding capacitor terminals (e.g., from above and below) by introducing solder into a remaining groove gap. This results in an easier connection of the individual capacitors to the transformer unit.

According to a further exemplary configuration, the at least one winding is the primary winding or the secondary winding of the transformer. A respective capacitor arrangement may likewise be provided both for the primary winding and for the secondary winding. The capacitor arrangements may be arranged, for example, on opposing end sides of the housing in this variant.

According to a first alternative configuration, the DC/DC voltage converter is a series resonant converter in which the first winding terminal is connected to the second capacitor arrangement terminal, and in which the second winding terminal is configured for connection to a second power module and in which the first capacitor arrangement terminal is configured for connection to a first power module.

In an alternative second configuration variant, the DC/DC voltage converter is a parallel resonant converter, in which the first winding terminal is connected to the first capacitor arrangement terminal and the second winding terminal is connected to the second capacitor arrangement terminal. The first winding terminal is configured for connection to a first power module, and the second winding terminal is configured for connection to a second power module.

In a manner known to those skilled in the art, a respective power module includes a half-bridge circuit. When a connection of a winding terminal to the power module is mentioned, then this should be understood in the present description such that the winding terminal is connected to the output of the half bridge (e.g., the node point of the two series-interconnected semiconductor switching elements of the half bridge).

DETAILED DESCRIPTION

In the present description, same elements are provided with same reference signs.

Figure 1:
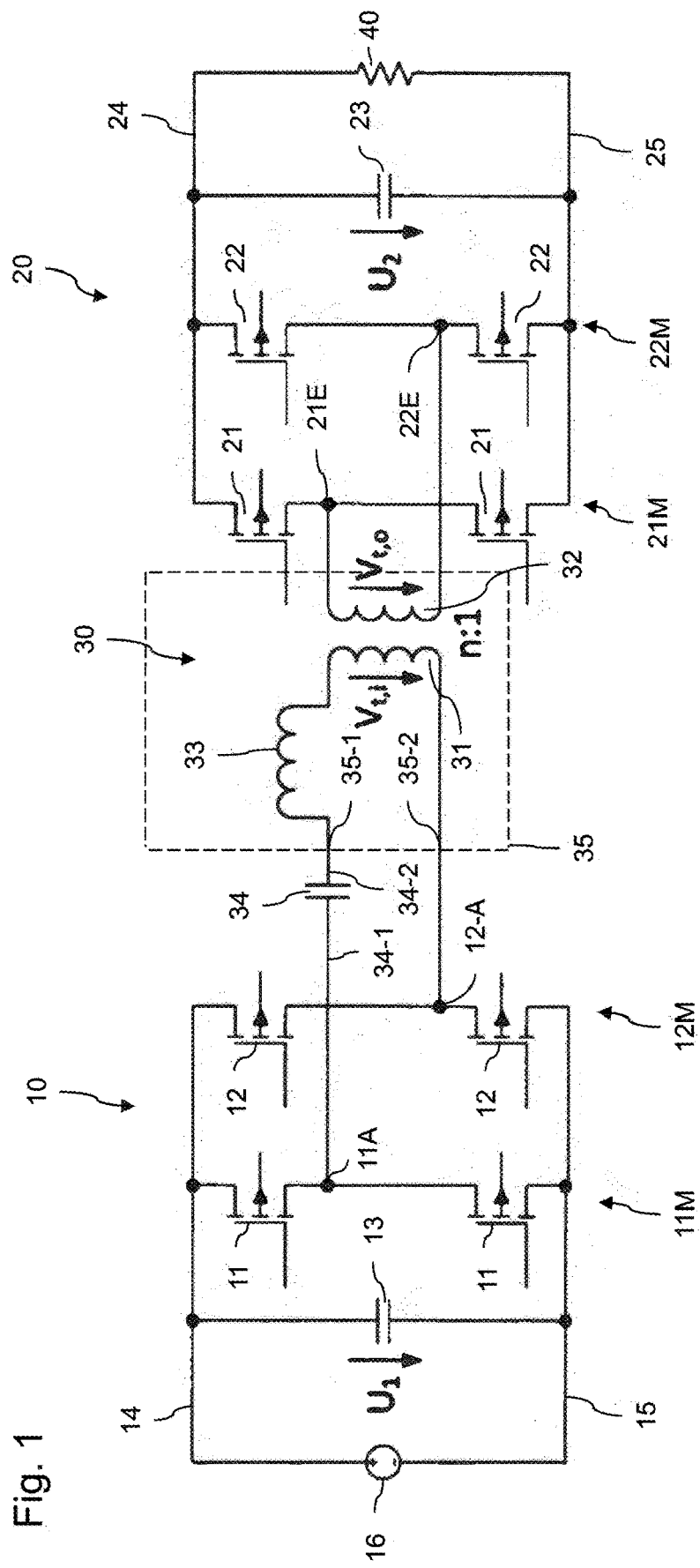
FIG. 1 shows an electrical circuit diagram of a DC/DC voltage converter known from the prior art.
Figure 2:
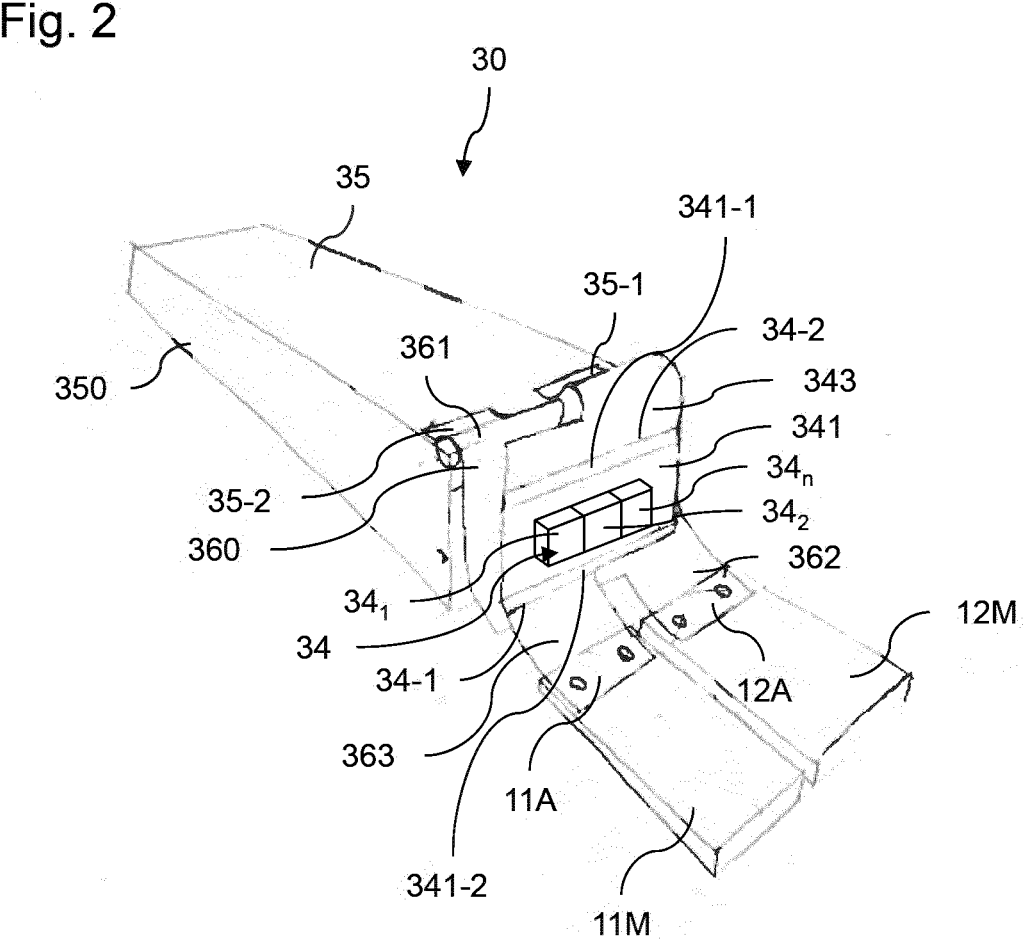
FIG. 2 shows a perspective schematic illustration of one embodiment of a transformer.

A transformer configured according to an embodiment, as shown schematically by way of example in a perspective illustration in FIG. 2, is used, for example, in a series resonant converter, as shown in FIG. 1. The transformer 30 according to one or more of the present embodiments includes a transformer unit 35 that includes the primary coil 31 already described in the introduction. The transformer unit 35, in addition to the primary winding 31, includes the secondary winding 32 and a stray inductance 33 that occurs during operation. It is therefore assumed in the following description that the stray inductance 33 is a component of the primary winding 31.

The transformer unit 35 is arranged in a housing 350 that has a substantially cuboid structure, merely by way of example. For the further description of the present embodiments, only the connection of the primary winding 31 to the first bridge circuit 10 according to FIG. 1 is of importance. For this reason, a description of the connection of the transformer unit 35 to the second bridge circuit 20 is not provided. The connection of the components described below may, however, also as an alternative or in addition take place on the secondary winding.

Winding terminals 35-1, 35-2 in the form of, for example, lugs or distribution strips are routed out of the transformer unit 35. As an alternative, wires or stranded wires may also be routed out of the transformer unit. The capacitor 34 shown in FIG. 1, which is configured as a capacitor arrangement 34 that includes at least one capacitor in the case of the transformer according to one or more of the present embodiments, is connected to the transformer unit 35 and the first bridge circuit 10 in accordance with the electrical circuit diagram shown in FIG. 1. The capacitor arrangement 34 for this purpose includes a first capacitor arrangement terminal 34-1 that is provided for connection to the output 11A of the power module 11M of the first bridge circuit 10 and is connected thereto in FIG. 2. A second capacitor arrangement terminal 34-2 is provided for connection to the first winding terminal 35-1 and is connected thereto.

The mechanical integration of the capacitor arrangement 34 onto or into the transformer unit 35 is described below.

The capacitor arrangement 34 includes n individual capacitors $34_1$, $34_2$ and $34_{nh}$ applied next to one another on a carrier 341 in the exemplary embodiment shown in FIG. 2. The individual capacitors $34_i$, where i=1 . . . n, may be ceramic capacitors. The number n is selected to be n=3 in the present exemplary embodiment. The number n may be selected depending on the capacitance to be achieved. This provides that n may be selected to be n ≥1.

The carrier 341 (e.g., a circuit board made from FR4) is provided with a conductor track structure, not able to be seen in more detail in the figure, by way of which the number n of individual capacitors 34, are electrically connected to one another. The multiplicity of individual capacitors 34, may be connected in series and/or in parallel with one another.

The carrier 341 with the capacitor arrangement 34 forms a prefabricated structural unit that is arranged on a front end side of the housing 350 of the transformer unit 35 in the exemplary embodiment. The carrier 341 may be mechanically attached to the housing 350 in any desired manner via clamping, screwing, a form-fitting connection, and the like.

The carrier 341 is electrically connected to the first winding terminal 35-1 of the transformer unit 35 in the region of a longitudinal side 341-1, at the top of the figure, via a first flat part 343. For this purpose, the first flat part 343 may be configured such that the first flat part 343 extends completely over the length of the upper longitudinal side 341-1 in the region adjoining the carrier 341. Opposite this, the first flat part 343 has roughly only half the width of the longitudinal side of the carrier 341 in the region facing the first winding terminal 35-1, so as firstly to be able to be connected flat to the first winding terminal 35-1 and secondly not to protrude into the region of the second winding terminal 35-2.

The carrier 341 is connected to the output terminal 11A of the first power module 11M via a second flat part 363 in the region of a lower longitudinal side 341-2. In this case, the second flat part 363 in the region adjoining the carrier 341 may optionally extend over the entire length of the lower longitudinal side 341-2.

The output 12A of the power module 12M is connected to the second winding terminal 35-2 of the transformer unit 35 via a further second flat part 360. The second flat part 360 for this purpose extends between the end-side wall of the housing 350 of the transformer unit 35 and the rear side of the carrier 341. A first connecting lug 361 of the second flat part 360 is connected to the second winding terminal 35-2. A second connecting lug 362 of the second flat part 360 is connected to the output terminal 12A of the power module 12M.

The flat parts may be electrically connected to the respective winding terminals 35-1, 35-2 and the output terminals 11A, 12A selectively by screwing, clamping, soldering, and the like.

Electrical insulation is provided between the second flat part 360 and the carrier 341. The electrical insulation may be formed by the material of the carrier 341 on the rear side thereof or an additionally provided layer of insulation. Such a layer of insulation may selectively be inserted in a manner fixed to the rear side of the carrier 341 or loosely between the carrier 341 and the second flat part 360.

FIG. 2 shows the application of the transformer 30 according to an embodiment to the power modules 11M, 12M of the first bridge circuit 10. What is not illustrated is an encapsulation surrounding the unit consisting of the transformer unit 35 and the structural unit consisting of the carrier 341 and the capacitor arrangement 34. This encapsulation consists of, for example, an insulating and thermally conductive plastic. This structural unit may, for example, be arranged in a housing that is likewise not illustrated, such that only the second flat part 363 and the second connecting lug 362 of the second flat part 360 protrude out of this encapsulation, so as then to be connected to the power modules 11M, 12M in the manner illustrated.

Such a structural unit consisting of the capacitor arrangement 34 (e.g., including the carrier 341) and the transformer unit 35 thus constitutes a transformer 30, in which the capacitor arrangement 34 is integrated into the transformer unit 35. If structurally small ceramic capacitors are used for the capacitor arrangement 34, use at high transmission frequencies is advantageous since only low losses arise.

Since the capacitor arrangement 34 is integrated into the transformer unit 35, the power modules 11M, 12M are able to be arranged directly next to the transformer 30. As a result, the electrical connection between active and passive components is able to be kept as short as possible.

In another exemplary embodiment that is not illustrated, the winding terminals 35-1, 35-2 may also be arranged behind one another, such that the winding terminals 35-1, 35-2 are able to (but do not have to) extend over the entire width of the end side of the transformer unit. The flat parts 343 and 360 then also extend behind one another or above one another in the region of the winding terminals 35-1, 35-2, where electrical insulation is provided between them. Combinations of both variants may also be provided.

Figure 3:
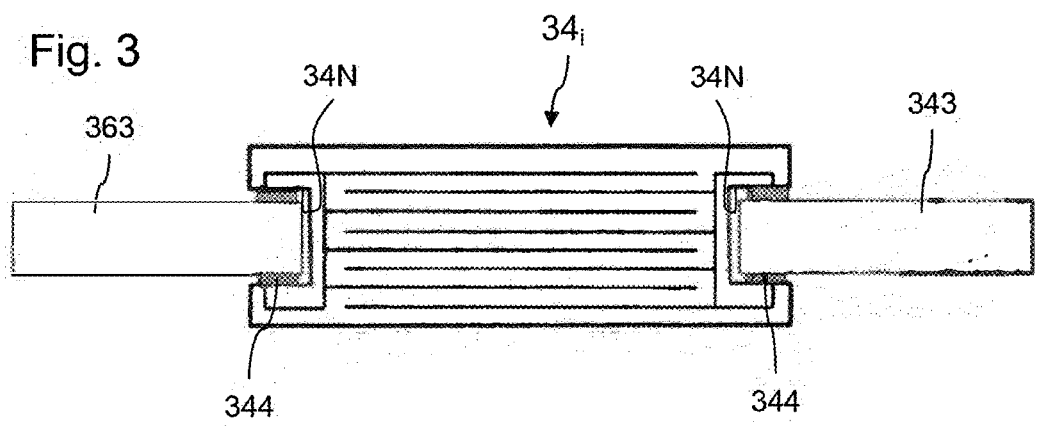
FIG. 3 shows a schematically enlarged illustration of a connection of flat parts to a capacitor, illustrated in cross section, of a transformer according to an embodiment.

In the configuration variant shown in FIG. 2, the individual capacitors 34, of the capacitor arrangement 34 are arranged on the carrier 341. This is not absolutely necessary. The individual capacitors 34, of the capacitor arrangement 34 may thus also be in direct contact with the flat parts that are routed to the individual capacitors 34. This may take place, for example, in the manner shown in FIG. 3, in which the presence of grooves 34N on opposing sides of the individual capacitors 34, is provided. Corresponding electrical terminals of the capacitors 34, protrude into the region of the grooves 34N. The first flat part 343 and the second flat part 363 may be inserted into the grooves 34N and be electrically connected to the terminals of the capacitor from above and below by solder 344.

In the above exemplary embodiments, flat parts have been described as connecting parts. These may be replaced in part or in full by wires or stranded wires.

The integration of the capacitor arrangement into the transformer unit, described by way of example in the present exemplary embodiment, may also be performed in the case of multiphase transformers and resonant circuits such as LLC converters.

The proposed procedure may be applied not just in the case of a series resonant converter, but also in the case of a parallel resonant converter in which the capacitor arrangement is arranged in parallel with the winding 31.

The proposed transformer has the advantage of lower outlay for connection and connecting technology between a winding (e.g., the primary winding) and the series resonant circuit and with regard to the power modules. Higher transmission frequencies are possible. The transformer has a lower volume and weight of the resonant circuit. Fewer losses occur. Easy thermal connection of the capacitor arrangement is possible.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A transformer for a DC/DC voltage converter, the transformer comprising:

a transformer unit that comprises at least one winding having a first winding terminal and a second winding terminal;

a capacitor arrangement comprising a capacitor having a first capacitor arrangement terminal and a second capacitor arrangement terminal;

wherein the capacitor arrangement is arranged so as to bear on the transformer unit, such that a structural unit is formed;

wherein the first capacitor arrangement terminal and the second capacitor terminal are connected in a predefined manner in terms of an electrical connection to the first winding terminal and the second winding terminal via one or more first connecting parts, and;

wherein the first capacitor arrangement terminal and the second capacitor arrangement terminal, the first winding terminal and the second winding terminal, or a combination thereof are electrically connected in a predefined manner in terms of the electrical connection to a plurality of second connecting parts for connection to a first power module and a second power module.

2. The transformer of claim 1, wherein the capacitor of the capacitor arrangement is arranged on a carrier.

3. The transformer of claim 2, wherein the carrier comprises a conductor track structure to which the one capacitor and the one or more first connecting parts and the plurality of second connecting parts are electrically connected.

4. The transformer of claim 2, wherein a first current path runs over the carrier, and a second current path that is electrically separate from the first current path runs behind the carrier, depending on the electrical connection.

5. The transformer of claim 2, wherein the one or more first connecting parts, the plurality of second connecting parts, or the one or more first connecting parts and the plurality of second connecting parts are soldered, screwed, or clamped to the carrier, the first winding terminal and the second winding terminal, or a combination thereof.

6. The transformer of claim 1, wherein the capacitor is a ceramic capacitor.

7. The transformer of claim 1, wherein the transformer unit comprises a housing in which the at least one winding is arranged, and
wherein the first winding terminal and the second winding terminal are routed out of the housing.

8. The transformer of claim 7, wherein the capacitor arrangement is arranged so as to bear on the housing, such that the structural unit is formed.

9. The transformer of claim 1, wherein the structural unit consisting of the capacitor arrangement and the transformer unit is arranged in a common casting compound, and
wherein the plurality of second connecting parts protrude out of the casting compound for connection to the first power module and the second power module.

10. The transformer of claim 1, wherein a connection between the capacitor and a first connecting part of the one or more first connecting parts or one second connecting part of the plurality of second connecting parts includes a solder connection, the solder connection including an inertion with a flat part of the first connecting part or the one second connecting part into a groove of the capacitor in which capacitor terminals end, and a connection to the first connecting part or the one second connecting part with solder.

11. The transformer of claim 1, wherein the at least one winding is a primary winding, a secondary winding or the primary winding and the secondary winding of the transformer.

12. The transformer of claim 1, wherein the one or more first connecting parts and the plurality of second connecting parts are flat parts wires, stranded wires, or any combination thereof.

13. The transformer of claim 1, wherein the DC/DC voltage converter is a series resonant converter in which the first winding terminal is connected to the second capacitor arrangement terminal, and in which the second winding terminal is configured for connection to the second power module, and in which the first capacitor arrangement terminal is configured for connection to the first power module.

14. The transformer of claim 1, wherein the DC/DC voltage converter is a parallel resonant converter, in which the first winding terminal is connected to the first capacitor arrangement terminal and the second winding terminal is connected to the second capacitor arrangement terminal, and in which the first winding terminal is configured for connection to the first power module and in which the second winding terminal is configured for connection to the second power module.

15. The transformer of claim 1, wherein the transformer is for a resonant converter.

* * * * *